A. KERTÉSZ.
PIPE COUPLING CLAMP.
APPLICATION FILED JULY 9, 1914. RENEWED FEB. 12, 1917.
1,223,054.  Patented Apr. 17, 1917.
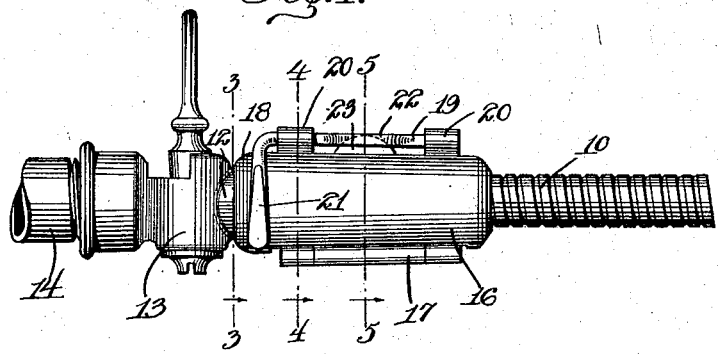
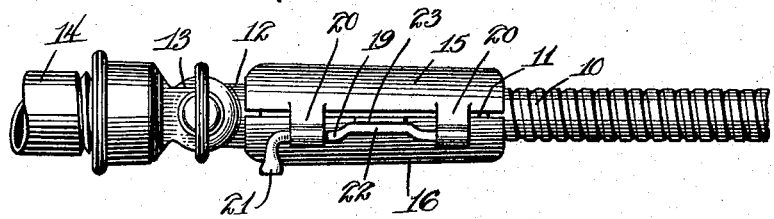
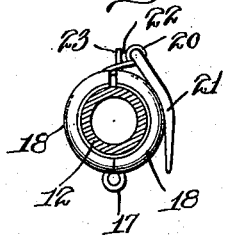 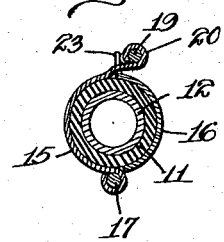 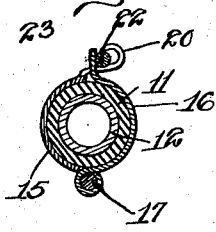

UNITED STATES PATENT OFFICE.

ALEX KERTÉSZ, OF NEWARK, NEW JERSEY, ASSIGNOR TO R. KERTESZ, OF NEWARK, NEW JERSEY.

PIPE-COUPLING CLAMP.

1,223,054.  Specification of Letters Patent.  Patented Apr. 17, 1917.

Application filed July 9, 1914, Serial No. 850,026. Renewed February 12, 1917. Serial No. 148,257.

*To all whom it may concern:*

Be it known that I, ALEX KERTÉSZ, a citizen of the United States, residing at Newark, in the county of Essex and State of New Jersey, have invented certain new and useful Improvements in Pipe-Coupling Clamps, of which the following is a specification.

This invention relates to a pipe coupler clamp which is intended to be used in connection with a flexible gas pipe and the principal object of the invention is to provide a clamp which can be placed about the terminal of the flexible gas pipe and securely hold the terminal upon the extension of the valve, thus preventing danger of the terminal becoming cracked or broken.

Another object of the invention is to so construct the clamp that it may be securely held in place but easily removed when desired to disconnect the gas pipe from the valve.

Another object of the invention is to so construct the clamp that it may be formed of sheet metal and thus very easily and cheaply manufactured.

This invention is illustrated in the accompanying drawings, wherein—

Figure 1 is a view in side elevation showing a gas pipe connected with a pipe by means of the improved clamp;

Fig. 2 is a view similar to Fig. 1 but shown in top plan;

Fig. 3 is a sectional view taken along the line 3—3 of Fig. 1;

Fig. 4 is a sectional view taken along the line 4—4 of Fig. 1;

Fig. 5 is a sectional view taken along the line 5—5 of Fig. 1.

The flexible gas pipe 10 is provided with the usual terminal 11 which fits upon the extension 12 of the valve 13 carried by the gas pipe 14. It very often happens that the terminal 11 which is formed of rubber or the like will crack or work loose from the extension 12 after being used for some time, thus permitting the gas to leak. In order to prevent leakage due to the cracking or slipping of the terminal, the clamp forming the subject matter of this invention has been provided.

This clamp is provided with two jaws 15 and 16 which are hinged as at 17 and have their end portions rolled inwardly to form the abutment flanges 18. These abutment flanges 18 extend over the opposite ends of the terminal 11 and thus prevent the terminal from moving longitudinally in the clamp. This clamp engages the extension 12 and pipe 10 and is of such size that when in the operative position it will compress the terminal 11 and thus cause the clamp to be securely held upon the terminal and also cause the terminal to be tightly compressed about the extension 12 and prevent all danger of leakage.

In order to releasably secure the clamp about the terminal there is provided a latch 19 which is rotatably mounted in the bearings 20 of the jaw 15, and has one end portion bent to form a lever 21 by means of which the latch may be turned, thus bringing the offset portion 22 of the latch into and out of engagement with lip 23 extending from the jaw 16 between the bearings 20 of jaw 15.

When this device is in use, the terminal 11 is placed upon the extension 12 of the valve 13 and the clamp is then opened and placed about the terminal with the flanges extending to inclose the ends of the terminal. The jaws of the clamp are then brought to the closed position and the latch moved to the position shown in the figures of the drawings, thus causing the offset portion 22 of the latch to engage the lip 23 and securely hold the clamp in a locked position. The terminal will now be tightly compressed about the extension 12 of the valve and will be securely held in place thereon. This clamp will also protect the terminal from slipping upon the extension 12 and will also prevent the terminal from being cracked by bending since the clamp extends to a point beyond the inner end of the terminal thus preventing the terminal from being bent. This clamp may be formed of sheet metal, which if desired, may be resilient. The latch may also be formed of resilient metal so that there will be a tight engagement between the tongue 23 and offset portion 22 of the latch.

What is claimed is:

A clamp comprising hingedly connected jaws, ears extending from one of said jaws, a lip extending from the second jaw and rigid therewith and extending between the ears of the first mentioned jaw, a latch pin rotatably carried by said ears and provided with an offset positioned between the ears for pressing against the outside face of the lip to clamp an object between said jaws, one end portion of said latch pin being bent to provide a lever arm.

In testimony whereof I affix my signature.

ALEX KERTÉSZ.

Copies of this patent may be obtained for five cents each, by addressing the "Commissioner of Patents, Washington, D. C."